US008649602B2

(12) United States Patent
Tang et al.

(10) Patent No.: US 8,649,602 B2
(45) Date of Patent: Feb. 11, 2014

(54) SYSTEMS AND METHODS FOR TAGGING PHOTOS

(75) Inventors: Shih-Min Tang, Jiali Township, Tainan County (TW); Chung-Yi Weng, Taichung (TW); Jau-Hsiung Huang, Sindian (TW)

(73) Assignee: Cyberlink Corporation, Shindian, Taipei (TW)

( * ) Notice: Subject to any disclaimer, the term of this patent is extended or adjusted under 35 U.S.C. 154(b) by 743 days.

(21) Appl. No.: 12/533,284

(22) Filed: Aug. 18, 2009

(65) Prior Publication Data

US 2011/0043437 A1   Feb. 24, 2011

(51) Int. Cl.
*G06K 9/00* (2006.01)

(52) U.S. Cl.
USPC .......................... 382/181; 382/224; 382/305

(58) Field of Classification Search
USPC .............................. 382/224, 181, 305; 345/55
See application file for complete search history.

(56) References Cited

U.S. PATENT DOCUMENTS

| | | | |
|---|---|---|---|
| 7,203,367 B2 | 4/2007 | Shniberg et al. | |
| 7,477,805 B2 | 1/2009 | Ohtsuka | |
| 2003/0210808 A1* | 11/2003 | Chen et al. | 382/118 |
| 2005/0105806 A1* | 5/2005 | Nagaoka et al. | 382/224 |
| 2006/0061598 A1 | 3/2006 | Mino et al. | |
| 2006/0251292 A1 | 11/2006 | Gokturk et al. | |
| 2007/0150801 A1* | 6/2007 | Chidlovskii et al. | 715/512 |
| 2008/0085036 A1 | 4/2008 | Fukushi | |
| 2008/0226140 A1 | 9/2008 | Okamura | |
| 2008/0298766 A1* | 12/2008 | Wen et al. | 386/46 |
| 2008/0304755 A1 | 12/2008 | Xiao et al. | |
| 2009/0252383 A1* | 10/2009 | Adam et al. | 382/118 |
| 2010/0226584 A1* | 9/2010 | Weng et al. | 382/225 |

OTHER PUBLICATIONS

Datta et al. "Toward Bridging the Annotation-Retrieval Gap in Image Search" IEEE Advances in Multimedia Computing, vol. 14, Issue 3, Jul. 2007.*

* cited by examiner

*Primary Examiner* — Aaron W Carter

(74) *Attorney, Agent, or Firm* — McClure, Qualey & Rodack, LLP

(57) ABSTRACT

Various systems and methods are described for tagging photos of individuals. A plurality of facial regions is detected from a plurality of images. The images are grouped based on similarities between the facial regions within the plurality of images. Tagging data associated with one or more of the clusters is received, and based on comparing the untagged clusters with tagged clusters, untagged clusters are tagged.

37 Claims, 10 Drawing Sheets

SYSTEMS AND METHODS FOR TAGGING PHOTOS

TECHNICAL FIELD

The present disclosure generally relates to electronic photo management and more particularly relates to systems and methods for tagging photos.

BACKGROUND

With the widespread use of digital cameras, many individuals turn to image management tools to archive and organize their digital photographs. Image management tools found on the market offer various features, including automatic image organization. The archived images may then later be viewed by the individual or published for others to view. Image management tools may also be used to search for a particular individual's photos within a collection of photographs. Such applications may be useful, for example, when a user wants to identify all photos of a particular individual so that the user can post and tag pictures of that individual on a website. Challenges may arise, however, when trying to organize a large volume of photos, particularly as more photos are added to an individual's archive and as the photos span a greater period of time. While manually organizing photos is an alternative, this approach can be tedious and time-consuming.

SUMMARY

Briefly described, one embodiment, among others, is a method of tagging photos utilizing a computer-implemented photo display system. The method comprises receiving by the photo display system a plurality of digital images comprising a plurality of individuals. The method further comprises detecting facial regions from the plurality of digital images received at the photo display system, and grouping the plurality of digital images into one or more clusters based on similarities between the facial regions within the plurality of images. The method further comprises receiving input from a user at the photo display system, where the input comprises tagging data associated with the one or more clusters. Correlation factors are calculated by comparing untagged clusters with tagged clusters, and suggested tagging data is assigned to the untagged clusters based on the correlation factors. The method further comprises selectively displaying the untagged clusters with the suggested tagging data based on a confidence level.

Another embodiment is a photo display system for tagging photos of individuals. The photo display system comprises a processor and a photo layout application stored in memory executable in the processor. The photo layout application comprises cluster logic for grouping digital images of individuals into clusters, a tag allocator configured to receive tag data for one or more of the clusters and generate tagged clusters, and a correlator configured to compare untagged clusters with the generated tagged clusters. The correlator is further configured to determine a correlation factor for each comparison, wherein based on the correlation factor, the correlator associates an untagged cluster with a tagged clusters.

Another embodiment is a method for tagging photos in a computer-implemented photo display system. The method comprises detecting a plurality of facial regions from a plurality of images and grouping images based on similarities between the facial regions within the plurality of images. The method also comprises receiving tagging data associated with clusters and assigning suggested tagging data to the untagged clusters based on comparing the untagged clusters with tagged clusters. The method further comprises selectively displaying one or more untagged clusters with corresponding suggested tagging data.

Other systems and methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
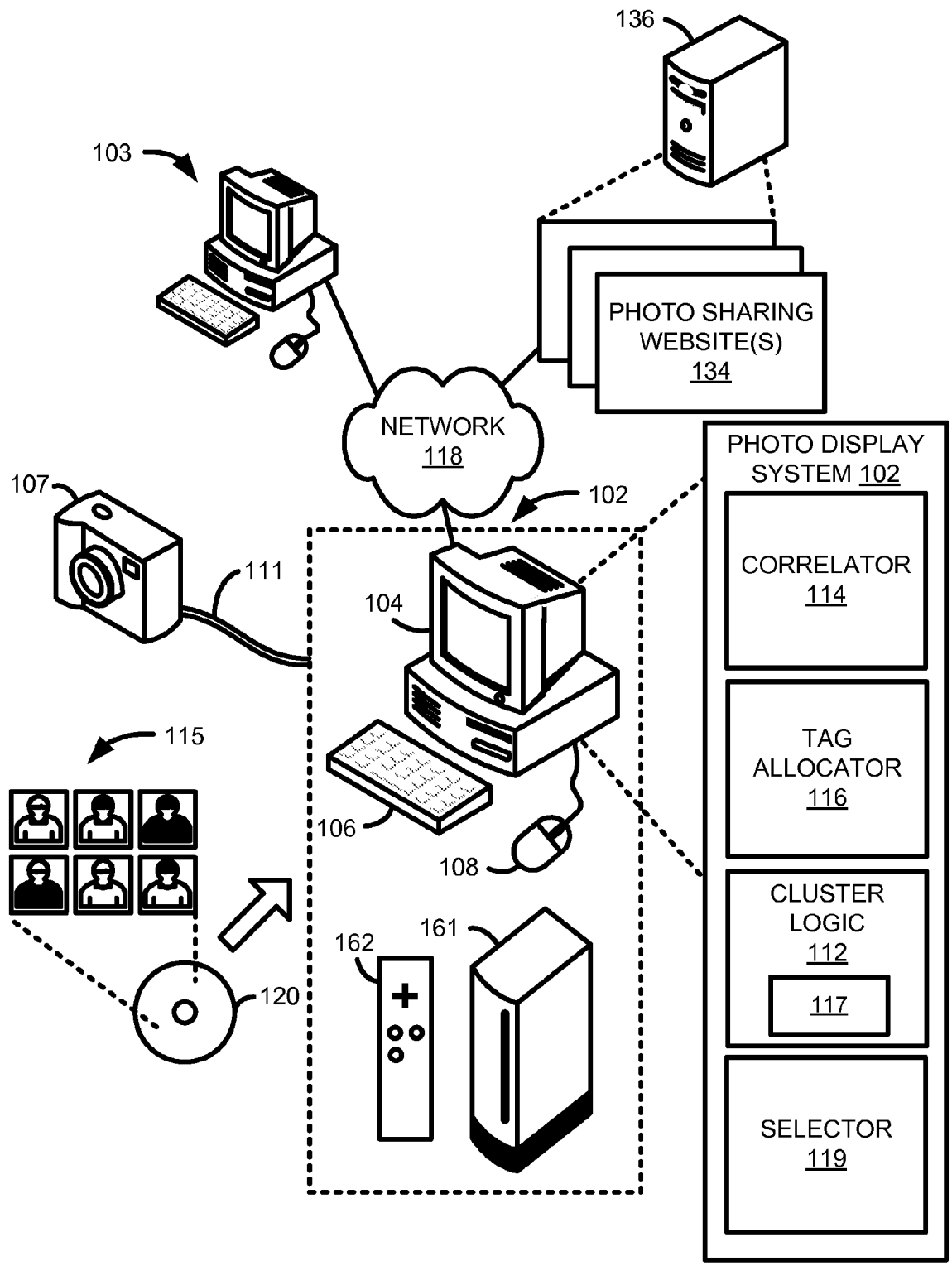
FIG. 1 depicts a top-level diagram of a photo display system for tagging photos.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, challenges may arise when trying to automatically organize a large volume of photos, particularly as more photos are added to a photo collection and as the photos span a greater period of time. While image management tools are available on the market that offer such features as automatic image organization, one perceived shortcoming with such tools is that an individual's appearance tends to change over the course of time, thereby making accurate identification of an individual more difficult. For example, an individual might undergo a number of hairstyle changes within the course of a year, making it difficult to accurately identify and group photographs of that individual. While manually organizing photos is an alternative, this approach can be tedious and time-consuming.

Various embodiments are described for accurately and efficiently tagging images of individuals in a photo display system. Digital images or photographs of individuals are clustered or grouped together. Once clusters of images have been established, all or a subset of the clusters are tagged, wherein a descriptor such as an individual's name is associated with the clusters. For some embodiments, the tags may be assigned by a user of the photo display system via a visual inspection of the clusters. In this regard, the tagged clusters serve as a baseline for tagging other clusters that do not have tags associated with them. For untagged clusters, correlation factors are generated based on a comparison of these untagged clusters with clusters that have been tagged. Untagged clusters may exist, for example, due to more photos being added to the photo collection.

Based on the correlation factors, tags are associated with the previously untagged clusters. In accordance with some embodiments, a confirmation of an assigned tag to each previously untagged cluster is received from a user of the photo display system. If a confirmation is not received, a corrected or modified tag may be received and associated with the cluster. In some embodiments, a plurality of facial regions is detected from within a plurality of images. In particular, images are grouped together based on similarities between the facial regions within the plurality of images. Such similarities may relate to, for example, facial features such as the eyes, nose, mouth, etc. Various facial recognition techniques may be used that are based on aligning the facial region and applying a dimensional reduction method to the facial region as a whole. Such techniques may include, but are not limited to, principle component analysis (PCA), linear discriminant analysis (LDA), and locality preservation projection (LPP). Other techniques include the use of local binary pattern (LBP) for extracting local and global features from the facial region as a whole. In other embodiments, Gabor wavelets may be used in describing features of the facial region. Scale invariant feature transform (SIFT) may also be used to extract feature points to describe the facial region. In this regard, the techniques discussed above may be used in identifying similarities between facial regions from among a plurality of images.

Tagging data associated with one or more of the clusters is received, and based on comparing the untagged clusters with tagged clusters, untagged clusters are tagged. For some embodiments, such tagging data may comprise the names of individuals and may be received through a user interface. Various components of an environment in which various embodiments operate are now described followed by a description of the operation of these components.

Reference is made to FIG. 1, which depicts a top-level diagram of a photo display system for tagging photos. The system comprises a photo display system 102 that may be embodied, for example, as a desktop computer, a computer workstation, or a laptop. The photo display system 102 includes a display 104 and input devices such as a keyboard 106 and a mouse 108. In other embodiments, the photo display system 102 may comprise a video gaming console 161, which includes a video game controller 162. For such embodiments, the video gaming console 161 may be connected to a television (not shown) or other display.

The photo display system 102 comprises cluster logic 112, which may be embodied, for example, in hardware or on a computer readable medium and executable by a processor. Cluster logic 112 is configured to receive a collection of photos 115 comprising one or more individuals and organize the photos 115 into clusters based on analyzing the images in the photos 115. This may involve focusing on the facial region of the images. As such, cluster logic 112 comprises a face detection module 117 configured to identify and analyze the facial region of digital images. In accordance with some embodiments of the face detection module 117, similarities in such facial features as the eyes, nose, mouth, etc. may be identified among different digital images. For example, the nostrils or corners of the lips and eyes may be identified and compared to the corresponding features in other images.

Generally, the face detection module 117 is configured to align the facial region where features (e.g., attributes relating to the eyes, noise, mouth) identified as being similar across multiple images are aligned together. Furthermore, dimension reduction is performed on the facial region as a whole using such techniques as PCA, LDA, LPP, and other techniques, as described earlier. When two facial images are compared, corresponding feature vectors from each image are extracted, and the distance between two feature vectors for each facial image is computed and compared across the two facial images. Note that each feature vector might contain extraneous information not useful for calculating distance values and in fact, might affect the precision of the computed distance. Dimension reduction thus involves discarding this additional information from each feature vector, thereby yielding a more simplified form that is useful for calculating distances. While the cluster logic 112 above has been described in the context of facial features, it should be emphasized that the clustering performed by cluster logic 112 is not based solely on analysis of the facial region and may include other attributes of the image such as the individual's clothing.

The photo display system 102 further comprises a correlator 114 configured to compare and correlate untagged clusters with tagged clusters. For some implementations, a correlation factor is generated during the comparison of untagged clusters with tagged clusters. Based on this correlation factor, an untagged cluster is associated with a tagged cluster such that a tag is assigned to or suggested for the untagged cluster. The photo display system 102 also comprises a tag allocator 116 configured to receive tag assignments from a user and to also assign tags based on decisions derived by the correlator 114. The photo display system 102 further comprises a selector 119 configured to selectively select untagged clusters with suggested tagging data to be displayed. More details relating to the components are described later. As with cluster logic 112, the correlator 114 and the tag allocator 116 may be embodied, for example, in hardware or on a computer readable medium and executed by a processor, as will be described in more detail below. The photo display system 102 in FIG. 1 receives digital images 115 stored on a storage medium such as, for example, a compact disc (CD) 120 or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files. As depicted in FIG. 1, the photo display system 102 may also receive digital images 115 directly from a digital camera 107 via a cable 111 or some other interface. The photo display system 102 may support any one of a number of common computer interfaces, such as, but not limited to IEEE-1394 High Performance Serial Bus (Firewire), USB, a serial connection, and a parallel connection.

The digital camera 107 may also be coupled to the photo display system 102 over a wireless connection or other communication path. The photo display system 102 may also be coupled to a network 118, such as the Internet or a local area network (LAN). Through the network 118, the photo display system 102 may receive digital images 115 from another photo display system 103. Alternatively, the photo display system 102 may also access one or more photo sharing websites 134 hosted on a server 136 via the network 118 to retrieve digital images 115.

Figure 2:
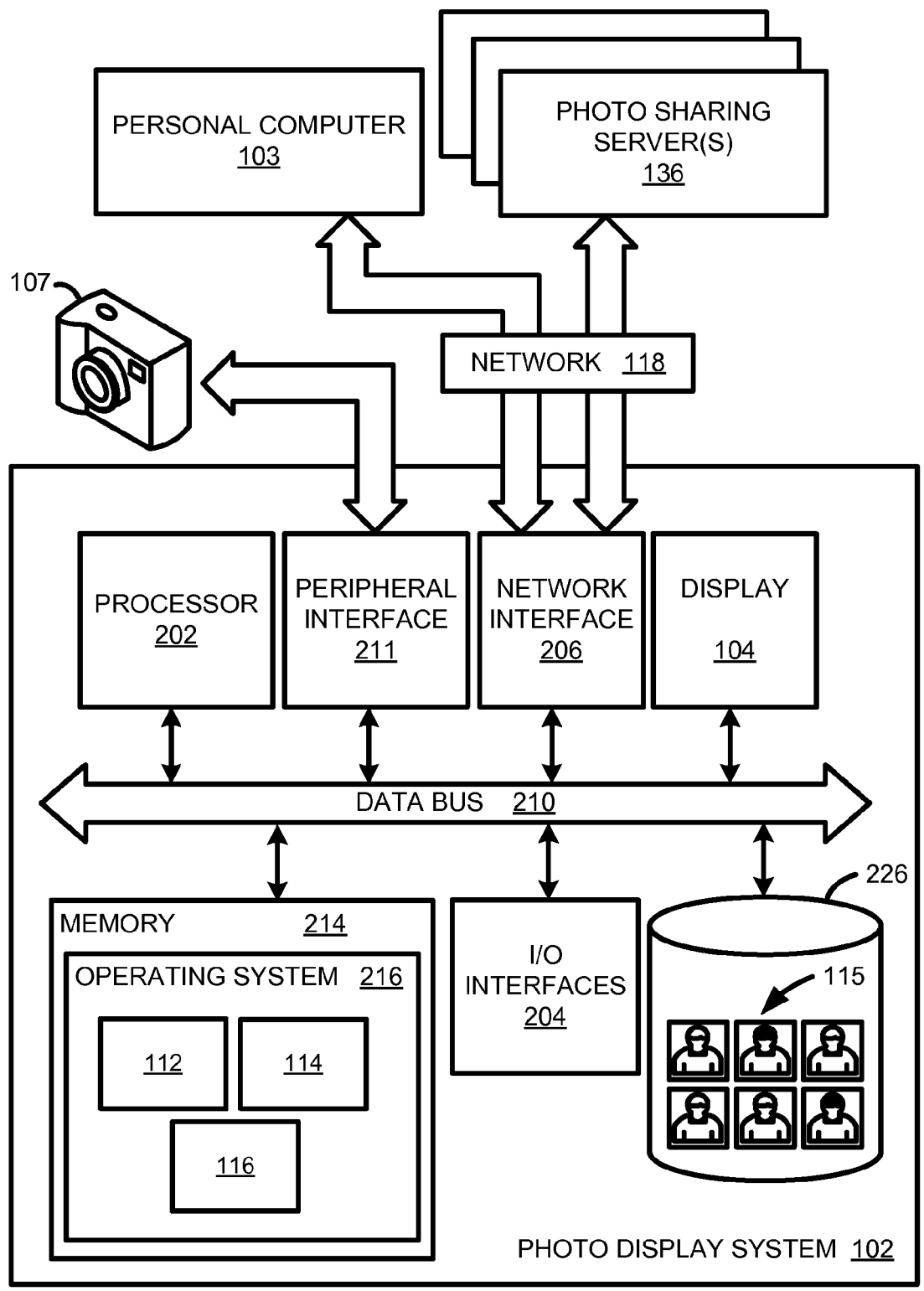
FIG. 2 illustrates an embodiment of the photo display system shown in FIG. 1.

FIG. 2 illustrates an embodiment of the photo display system 102 shown in FIG. 1. The photo display system 102 may comprise any one of a wide variety of wired and/or wireless computing devices, such as a desktop computer, portable computer, dedicated server computer, multiprocessor computing device, smartphone, personal digital assistant (PDA), and so forth. As shown in FIG. 2, the photo display system 102 comprises memory 214, a processing device 202, a number of input/output interfaces 204, a network interface 206, a display 208, a peripheral interface 211, and mass storage 226, wherein each of these devices are connected across a local data bus 210.

The processing device 202 may include any custom made or commercially available processor, a central processing unit (CPU) or an auxiliary processor among several processors associated with the photo display system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise the correlator 114, tag allocator 116, and cluster logic 112 of FIG. 1. In accordance with such embodiments, the correlator 114, tag allocator 116, and cluster logic 112 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the photo display system 102 comprises a personal computer, these components may interface with user input device 204, which may be a keyboard or a mouse, as shown in FIG. 1.

Where the photo display system 102 comprises a gaming console, the input/output interfaces 204 may communicate with a video game controller such as, for example, the wireless Wii Remote® and Wii MotionPlus® from Nintendo or the DualShock® and wand-shaped motion controller from Sony. Display 208 can comprise, for example, a computer monitor, plasma television, or a liquid crystal display (LCD). As will be described in more detail later, a user may enter tag information via a user interface rendered on the display 104 using the input/output interfaces 204.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 2, the photo display system 102 may communicate with one or more photo sharing servers 136 or another photo display system 103 via the network interface 206 over the network 118. The photo display system 102 may further comprise mass storage 226 which stores and manages such data as received digital images 115. The peripheral 211 interface supports various interfaces including, but not limited to IEEE-1394 High Performance Serial Bus (Firewire), USB, a serial connection, and a parallel connection.

Figure 3:
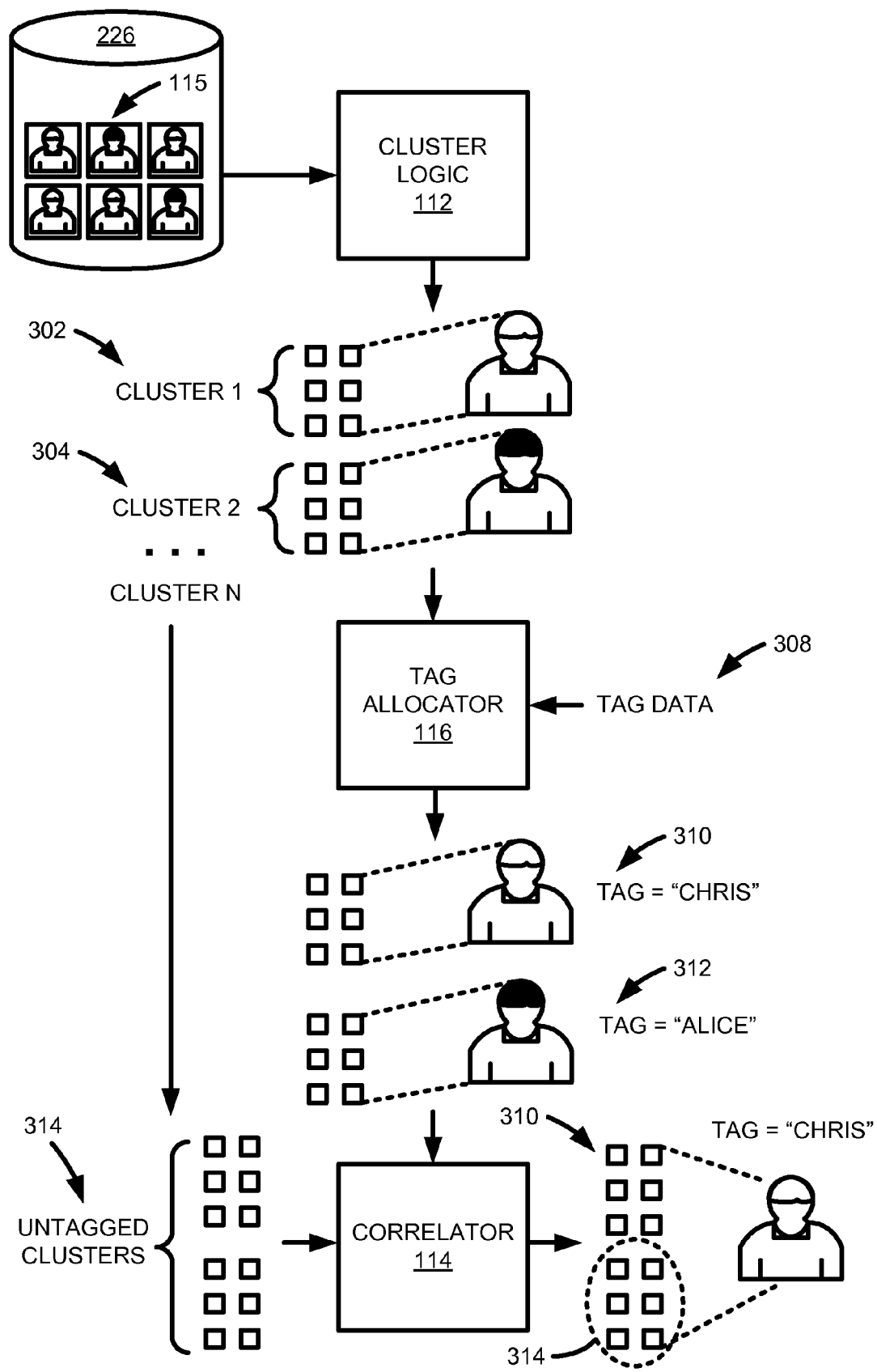
FIG. 3 illustrates the general data flow for an embodiment of the photo display system in FIG. 1.

FIG. 3 illustrates the general data flow for an embodiment of the photo display system 102 in FIG. 1. As described in reference to FIG. 1, digital images 115 may be received at the photo display system 102 through various means, which includes, for example, receiving digital images 115 from a storage medium 120 and through photo sharing websites 134. Mass storage 226 of the photo display system 102 may store the digital images 115. Cluster logic 112 retrieves the digital images 115 from mass storage 226 for processing. In particular, cluster logic 112 performs cluster analysis by analyzing the digital images 115 and separating the digital images 115 into clusters or groups based on the one or more individuals depicted in the digital images 115. As a non-limiting illustration, FIG. 3 illustrates cluster logic 112 determining that there are N unique individuals depicted in the assortment of digital images 115. As such, N clusters 302, 304 are formed by cluster logic 112. As described earlier, cluster 112 may perform facial analysis via the face detection module 117 shown in FIG. 1 to analyze the facial attributes of each digital image 115.

As one will appreciate, it may be more difficult to accurately identify and group digital images 115 of the same individual when the digital images 115 span a long period of time. A change in hairstyle, for example, can make it more difficult to determine whether one digital image depicts the same individual as that of another digital image. Cluster logic 112 thus incorporates various clustering techniques whereby images are grouped together in a hierarchal fashion. Rather than analyzing all the digital images 115 independently and adding digital images 115 one at a time to a group, cluster analysis begins by grouping digital images into small clusters and then adding clusters together to form larger clusters. Various clustering techniques are described in application Ser. No. 12/237,706, entitled "Systems and Methods for Performing Image Clustering" filed on Sep. 25, 2008, application Ser. No. 12/406,973, entitled "Method of Browsing Photos Based on People" filed on Mar. 19, 2009, and application Ser. No. 12/399,018, entitled "Method of Grouping Images by Face" filed on Mar. 6, 2009, herein incorporated by reference in their entireties.

Once the digital images 115 are separated into clusters 302, 304, the tag allocator 116 receives the clusters 302, 304 and receives tag data 308. For some implementations, the tag data 308 may be in the form of user input received via the I/O interfaces 204 in FIG. 2. For such implementations, the photo display system 102 renders a user interface on the display 104 and prompts the user for tag information 308 for one or more of the generated clusters 302, 304. As described earlier, the tag information 308 may comprise individuals' names or some other descriptor to be associated with a particular cluster 302, 304. The tag allocator 116 associates the received tag data 308 with each corresponding cluster 302, 304, thereby forming tagged clusters 310, 312. In the non-limiting illustration shown, one cluster has the tag "Chris" while another cluster is tagged as "Alice."

The tagged clusters 310, 312 are received by the correlator 114, which then attempts to correlate any untagged clusters 314 with the tagged clusters 310, 312. In this regard, a user of the photo display system 102 does not have to manually tag new digital images 115 as they are received by the photo display system 102, thereby saving substantial time and effort in organizing photos. Untagged clusters 314 may result from new digital images being added to a collection of digital images 115 already stored in mass storage 226. Untagged clusters 314 may also result from the user not tagging every cluster 302, 304 when prompted. Thus, as depicted in FIG. 3, some of the clusters 302, 304 derived by cluster logic 112 may remain untagged. For various implementations, correlator 114 compares each untagged cluster 314 which each tagged cluster 310, 312 and performs a one-to-one comparison.

Figure 4:
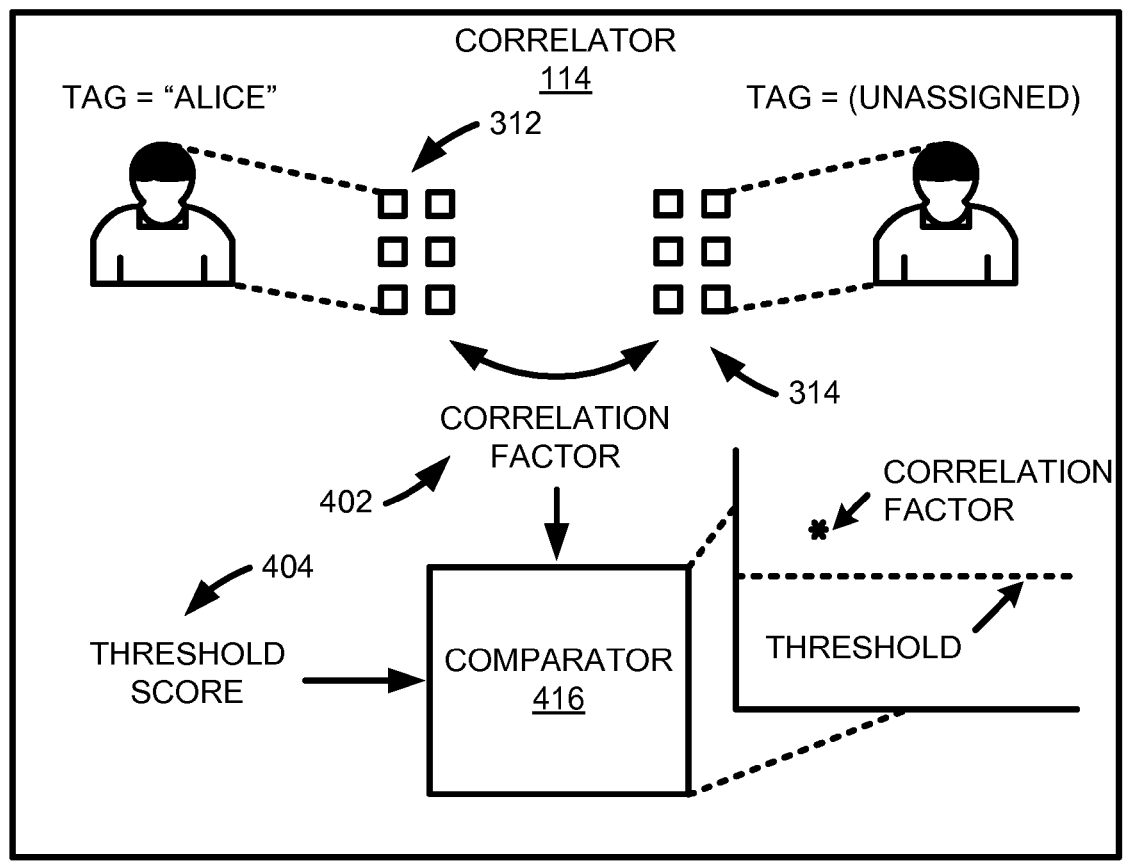
FIG. 4 illustrates the general data flow of the correlator in FIGS. 1-3.

With reference to FIG. 4, the correlator 114 assigns a correlation factor 402 as a result of each comparison. For example a first untagged cluster 314 is compared to the cluster 310 tagged as "Chris" and also to the cluster 312 tagged as "Alice." The first comparison with "Chris" may result in a correlation factor 402 of 45, for example, while the second comparison with "Alice" may yield a correlation factor 402 of 85. For some embodiments, the correlation factor 402 is forwarded to a comparator 416, which first identifies the pairing that resulted in the highest correlation factor. In the example above, the comparison with "Alice" yielded the higher correlation factor (85) between the two comparisons performed.

The correlation factor (85) is then compared to a threshold score 404 to determine whether the correlation between the untagged cluster 314 and the tagged cluster 312 is high enough to associate the untagged cluster 314 with the tagged cluster 312. For some embodiments, the threshold score 404 may be predetermined and may be the same across all comparisons performed. For other embodiments, however, the threshold score 404 may be set based on attributes associated with the digital images 115 being processed. For example, if the collection of tagged and untagged clusters is primarily that of children, the threshold score may be adjusted to account for the likelihood that a child's appearance will likely experience a greater degree of change over a given period of time when compared to an adult. Likewise, the calculated correlation factor may also be adjusted to account for such factors. In this regard, suggested or "guessed" tags/tagging data are assigned to untagged clusters.

Various embodiments are now directed to selectively displaying a certain number of untagged clusters with suggested or guessed tagging data. As described above, examples of suggested tagging data may include names (e.g., "Alice") or some other descriptive identifier associated with other tagged data (e.g., tagged photos). The step of selectively displaying data with suggested or guessed tags is performed based on a confidence level, which may be predefined. Generally, each untagged cluster is assigned to a suggested tag based on the correlation factor, but not necessarily displayed. Untagged clusters are assigned suggested tags by comparing the correlation factor with a predetermined threshold. The results are then selectively displayed as untagged clusters with suggested tagging data based on whether the untagged clusters have a correlation factor higher than the confidence level described above. Suggested tagging data and the associated cluster are thus displayed based on whether there is a high level of confidence. For some implementations, a user interface may indicate to the user that the tagging data being displayed is suggested or guessed tagging data.

As suggested tagging data may or may not be correct, users can confirm or modify the suggested tags in order to change the untagged clusters to tagged clusters. The process of selectively displaying clusters of images may further comprise displaying only those clusters that have a correlation factor greater than or equal to a predetermined threshold. For other implementations, only X clusters are displayed, where the number X represents the top X clusters with the highest correlation factors. The number X may be predetermined or may be specified by the user. As such, selectively displaying the untagged clusters with the suggested tagging data may comprise displaying the untagged clusters with the suggested tagging data based on prioritizing the correlation factors from a highest correlation factor to a lowest correlation factor. Other embodiments for displaying clusters involve displaying a certain number of clusters based on the number of unique faces within a particular collection of images. As a nonlimiting example, if the cluster logic 112 of FIG. 1 determines that there are ten unique individuals depicted within the collection of images, then ten clusters are displayed. This number, however, may also be specified by the user. Furthermore, displaying clusters may involve displaying clusters based on time and date information associated with the images. For example, those clusters that contain images taken two months from each other may be displayed.

The correlation factor 402 may be calculated based on degree of similarity between two clusters and may be assigned according to a predetermined scale (e.g., 100). In particular, the degree of similarity may be based on such attributes as facial features, clothing, image background, etc. As described earlier for implementations involving analysis of facial features, dimension reduction is performed on the facial region as a whole using such techniques as PCA, LDA, LPP, and other techniques. For some implementations, the correlation factor 402 may be based on a comparison of facial images where corresponding feature vectors from each image are extracted, and the distance between two feature vectors for each facial image is computed and compared across the facial images. As each feature vector might contain extraneous information not useful in terms of calculating distance values, dimension reduction involves discarding this additional information from each feature vector, thereby yielding a more simplified form that is useful for calculating distances. It should be emphasized that the correlation factor 402 may also be derived based on other attributes of the image such as the individual's clothing.

Figure 5A:
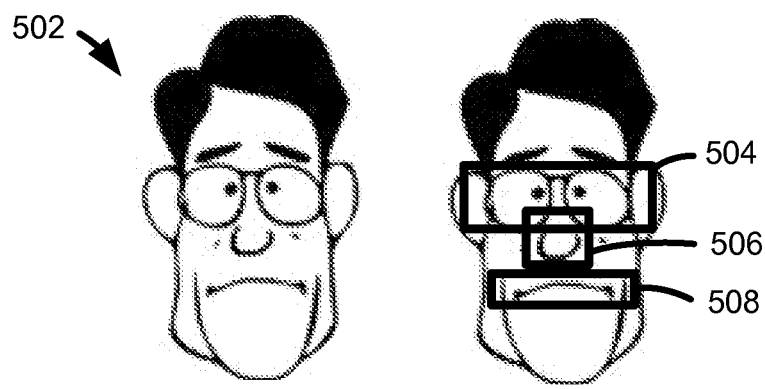
FIGS. 5A-B illustrate an embodiment for deriving the correlation factor of FIG. 3.
Figure 5B:
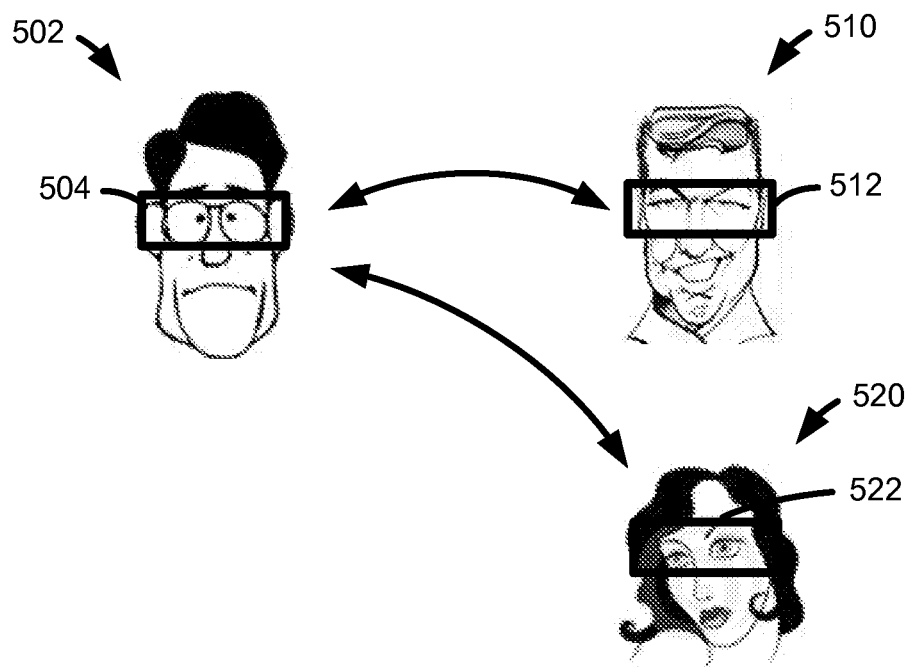

For some embodiments, the attributes may be assigned weighting factors, and the correlation factor may be assigned according to a predetermined scale (e.g., 0 to 100). Reference is made to FIGS. 5A-B, which illustrate an embodiment for deriving the correlation factor 402. In accordance with various embodiments, certain predetermined facial regions 504, 506, 508 may be identified and used to perform a comparison with other images 510, 520 of individuals. In the illustration shown in FIG. 5A, the face 502 includes an eye region 504, a nose region 506, and a mouth region 508. Each of these regions 504, 506, 508 may be assigned a weight factor used in deriving a correlation factor 402. With reference to FIG. 5B, the eye region 504 of the first image 502 is compared with the eye region 512 of a corresponding second image 510. A similar comparison is made between the first image 502 and a third image 520, which includes a corresponding eye region 522. The corresponding nose regions and mouth regions are also compared, and based on the weight factor assigned to each region, a correlation factor 402 is derived between two images.

To illustrate, suppose a comparison between two images yields the following scores: eye region score=95, nose region score=86, and mouth region score=80. The correlation factor 402 may be calculated according to the following equation: correlation factor=w1*eye region score+w2*nose region score+w3*mouth region score, where w1, w2, and w3 are weighting factors. Note that other features such as clothing, hair style, or other facial attributes may be used in calculating the correlation factor 402. For example, ratios of various facial features may be used, such as the distance between the eyes compared with the distance between the eyes and the mouth.

Figure 6A:
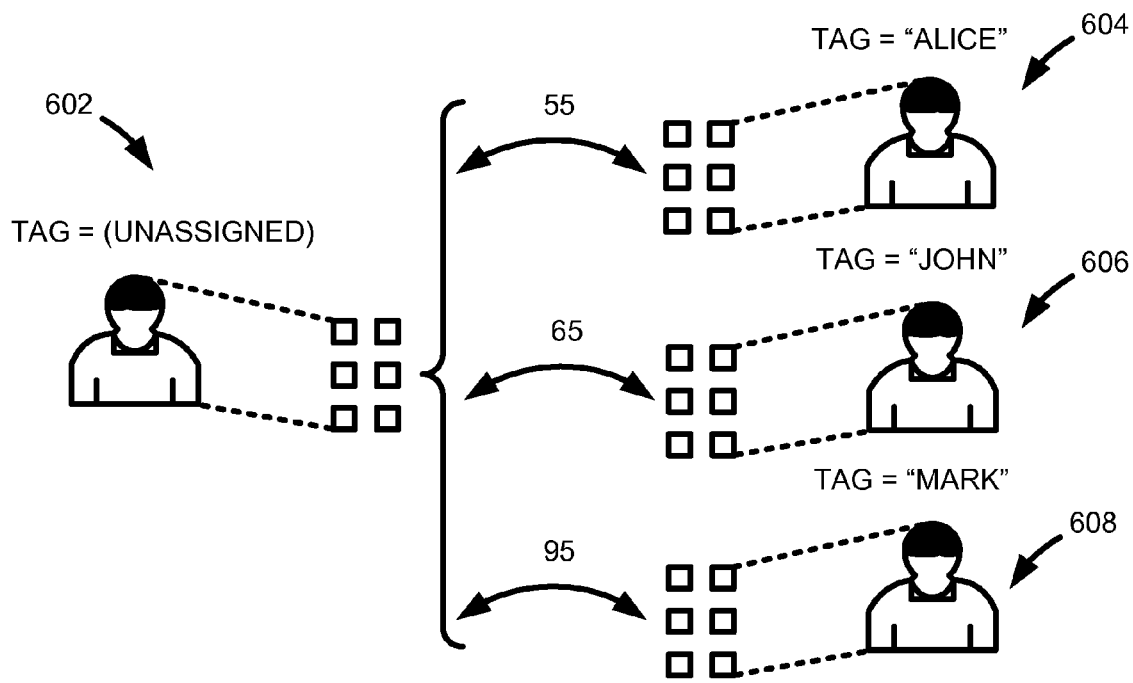
FIG. 6A illustrates an untagged cluster being compared to each tagged cluster.
Figure 6B:
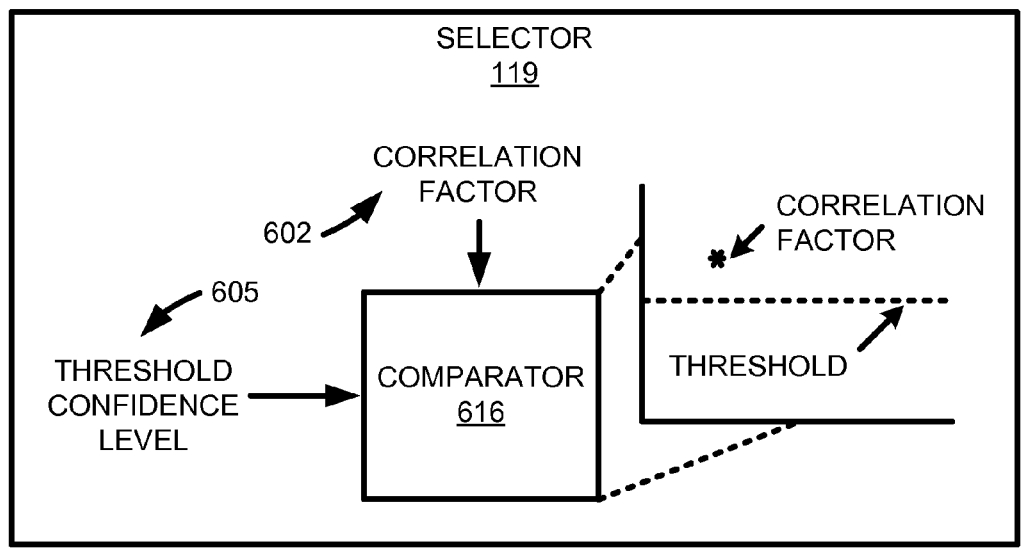
FIG. 6B is an embodiment of the selector in FIG. 1 for selectively displaying clusters or photos with suggested tagging data.

FIG. 6A illustrates an untagged cluster 602 being compared to each tagged cluster 604, 606, 608. For each comparison performed, a corresponding correlation factor is calculated or derived, as shown in FIGS. 5A-B. In the example shown, correlation factors of 55, 65, and 95 are calculated with the untagged cluster 602 having the strongest correlation with the cluster 608 tagged as "Mark." This correlation factor is then compared to the threshold score described above. FIG. 6B is an embodiment of the selector 119 in FIG. 1 for selectively displaying clusters or photos with suggested tagging data. As described earlier, suggested or guessed tagging data may or may not be accurate, and thus for some implementations, users are able to confirm or modify the suggested tags in order to change the tagging data associated with a given cluster or photo. For some embodiments, however, the suggested tagging data is first evaluated. Based on whether there is a high level of confidence that the suggested tagging data is accurate, the suggested tagging data is displayed for a user to either confirm or modify. In this regard, if a minimum level of confidence is not met with respect to a set of suggested tagging data, the suggested tagging data and the corresponding cluster or photo are not displayed.

As shown in FIG. 6B, a comparator 616 in the selector 119 is utilized to compare a threshold confidence level 605 with a correlation factor 602. Referring back briefly to FIG. 6A, the correlation factor 602 forwarded to the comparator 616 may be based on the untagged cluster 602 having the strongest correlation with a given cluster. For the illustration in FIG. 6A, the strongest correlation exists with the cluster 608 tagged as "Mark." As such, the derived correlation factor (i.e., 95) is compared to the threshold confidence level 605 shown in FIG. 6B. If the correlation factor 602 exceeds the threshold confidence level 605, then the suggested or guessed tag (i.e., "Mark") and its associated cluster are displayed for a user to verify or modify. Note that the threshold confidence level 605 in FIG. 6B is separate from the threshold score 404 in FIG. 4, although the two values may overlap. The predetermined threshold is used to assign tagging data to untagged clusters whereby untagged clusters are assigned suggested or guessed tagging data. The confidence level is used to decide whether clusters and their suggested tagging data are displayed on a user interface. As a nonlimiting example, suppose the predetermined threshold used for assigned tagging data to untagged clusters is 60, and suppose the confidence level is 90. For this example, only a portion of untagged clusters with suggested tagging data is shown.

Figure 7A:
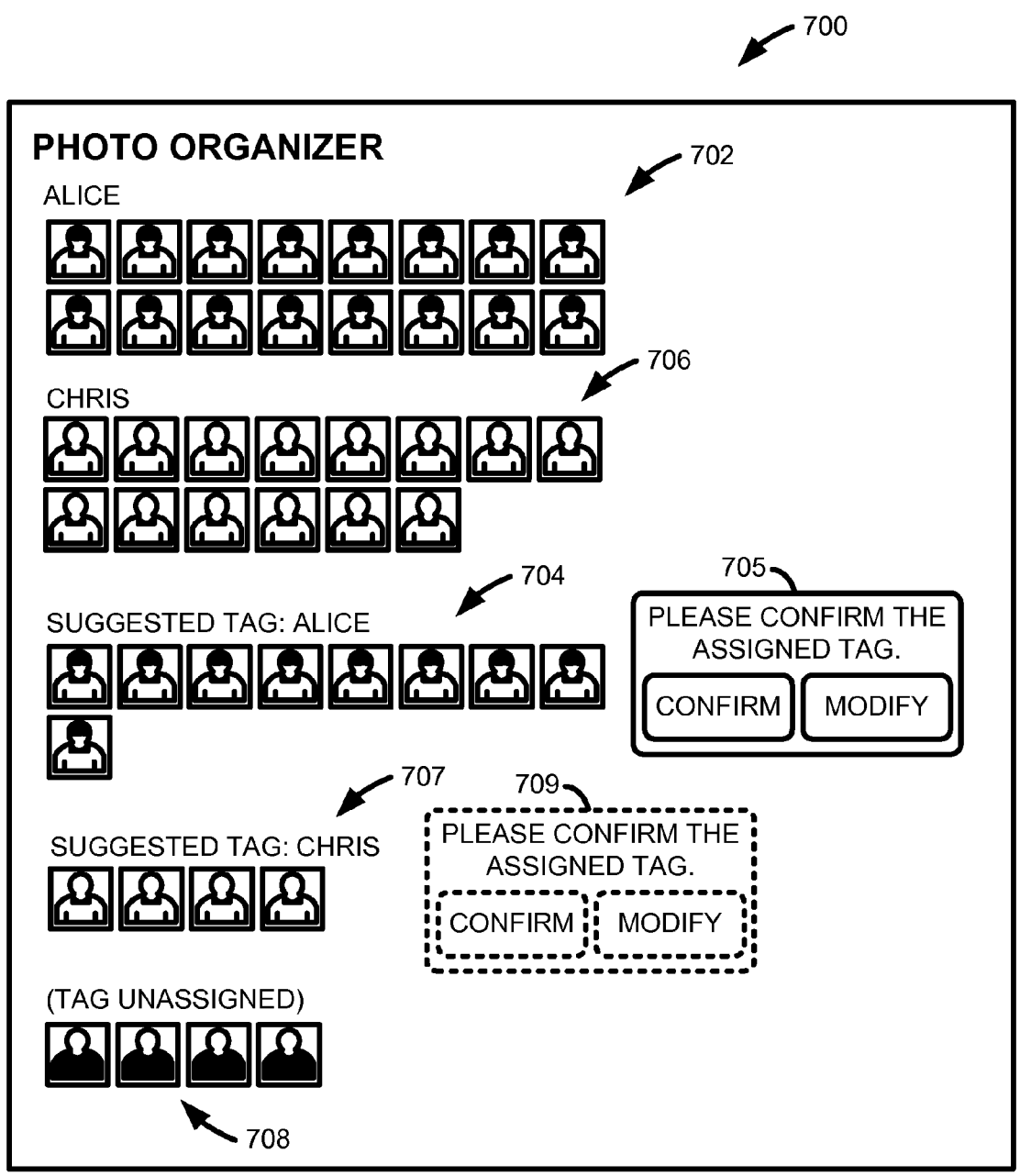
FIGS. 7A-B are embodiments of a user interface rendered on the photo display system of FIG. 1.
Figure 7A:
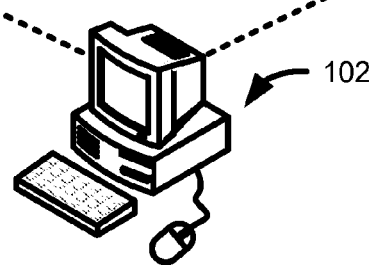

FIG. 7A is an embodiment of a user interface 700 rendered on the photo display system 102 of FIG. 1. The user interface 700 shows various clusters 702, 704, 706, 708, including tagged clusters and untagged clusters. As shown in FIG. 6, cluster 702 is tagged as "Alice." For purposes of illustration, it will be assumed that this cluster 702 was manually tagged by a user of the photo display system 102 via the I/O interfaces 204 in FIG. 2. In particular, the cluster 702 was tagged based on the descriptor "Alice" being entered by a user via the user interface 700. Also, for this illustration, the cluster 704 below is a previously untagged cluster which has been assigned a suggested or guessed tag by the tag allocator 116 and the correlator 114 of FIG. 3. In particular, the tag ("Alice" in the example shown) was assigned based on a correlation factor calculated or derived as a result of comparing the untagged cluster 704 with a tagged cluster 702. Moreover, as a result of the correlation factor exceeding the threshold score 404 (as depicted in FIG. 4), the untagged cluster 704 is associated with the tagged cluster 702. In the nonlimiting user interface 700 shown, an indicator (i.e., "SUGGESTED TAG: ALICE") is provided to alert the user that the associated tag is a suggested or guessed tag that may or may not be correct. As described above, some embodiments involve selectively displaying untagged clusters. Here, for example, it can be assumed that the untagged cluster 704 is selectively displayed with a suggested tag "Alice" based on the correlation factor being greater than a predetermined confidence level.

In some implementations, the photo display system 102 receives a confirmation from the user of the photo display system 102 via a dialog box 705, which prompts the user to either confirm the suggested tag or to modify the assigned tag. As such, the user input may comprise either a confirmation or a modification of the "guessed" or suggested tag assigned to cluster 704. Shown in FIG. 7 are other clusters, including another tagged cluster 706 (tagged as "Chris"), an untagged cluster 707 with suggested tag "Chris", and an untagged cluster 708. Again, for untagged cluster 707 assigned the suggested tag "Chris," a dialog box 709 may be displayed that allows the user to either confirm or modify the suggested tag. As with the example above involving the untagged cluster 704 with suggested tag "Alice," it can be assumed that the untagged cluster 707 here is being displayed with a suggested tag "Chris" because the correlation factor is greater than a predetermined confidence level. Untagged clusters with suggested tags are thus selectively displayed.

For some embodiments, selectively displaying untagged clusters further comprises displaying untagged clusters according to the correlation factor, whereby those untagged clusters with correlation factors exceeding a predetermined confidence level are displayed in descending order based on the correlation factor. Untagged clusters with suggested tags that are shown at the top of the display have a higher correlation factor than those near the bottom of the display. The user then knows that there is a higher degree of confidence that the suggested tags assigned to the untagged clusters shown first (e.g., at the top of the display) are more likely to be accurate. Referring back to the example in FIG. 7, the untagged cluster 704 with suggested tag "Alice" has a higher correlation factor than the untagged cluster 707 with suggested tag "Chris" and is therefore displayed above the untagged cluster 707. Thus, clusters with suggested tags are displayed based on confidence level and/or priority of the correlation factor. Note that the example above is just one of various ways to selectively display clusters. Finally, the cluster 708 at the bottom is left untagged because of a low correlation factor, whereby no strong matches with existing tagged clusters were identified. Note that for implementations where clusters are selectively displayed, if the cluster 708 has a correlation factor lower than the confidence level or the ranking of the correlation factor is relatively low when compared to other clusters, the cluster 708 will not be displayed and will not be assigned a suggested tag.

Figure 7B:
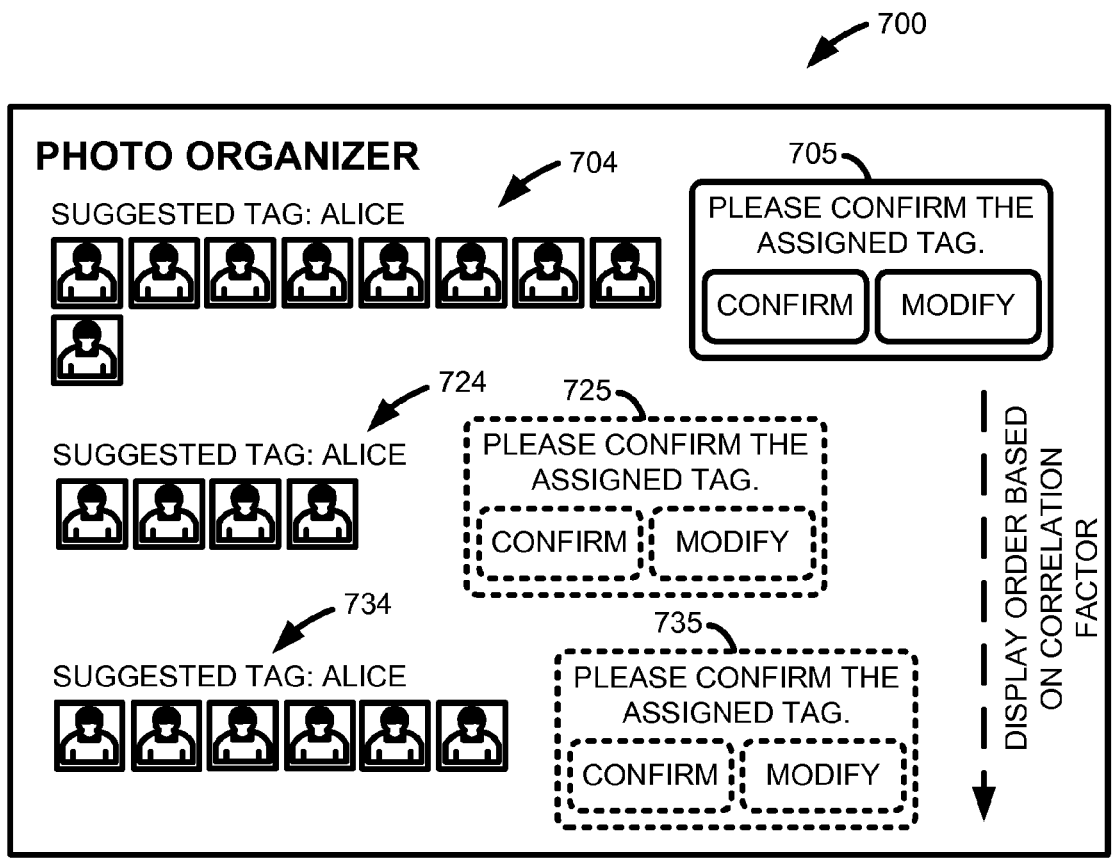
Figure 7B:
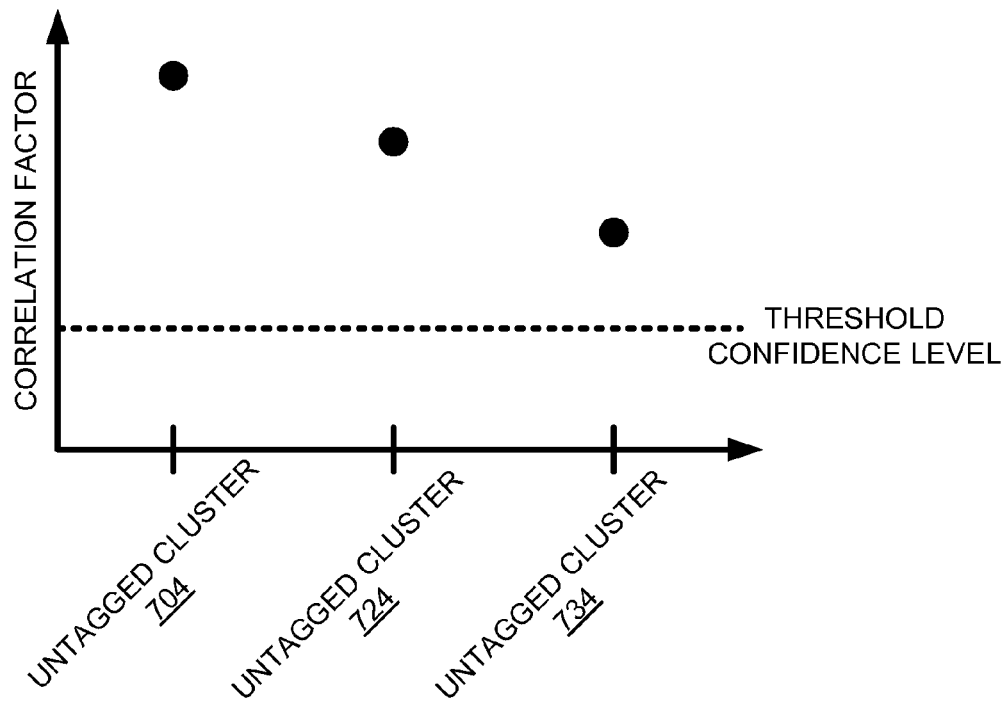

FIG. 7B is another embodiment of a user interface 700 rendered on the photo display system 102 of FIG. 1. For some implementations, multiple untagged clusters 704, 724, 734 may be assigned the same suggested tag (e.g., "Alice") as pictures are taken over a long period of time and as more pictures are added to the collection. In some cases, the photo display system 102 may already contain untagged clusters with suggested tags that are awaiting confirmation or revision by the user when new photos of the same individual are added to the collection. This may result in separate untagged clusters being assigned the same suggested tag. Suppose, for example, that the first untagged cluster 704 comprises pictures taken close together in time. The second untagged cluster 724 may also comprise pictures taken close together in time but taken far apart in time from the first untagged cluster 704. As such, the clusters 704, 724, 734 may be treated separately and independently assigned suggested tags. For the embodiment shown, the untagged clusters 704, 724, 734 are selectively displayed based on whether their corresponding correlation factors exceed a threshold confidence level. Furthermore, the untagged clusters 704, 724, 734 are displayed in a particular order, beginning at the top with the cluster with the highest correlation factor. The user is given the opportunity to confirm or modify the suggested tag via the dialog boxes 705, 725, 735 shown. Note that for the embodiments described, a collective confirmation, rather than individual confirmations, may be received for all suggested tags.

Some embodiments may incorporate an automatic merge feature whereby untagged clusters 704, 724, 734 such as the ones shown in FIG. 7B are merged based on their corresponding correlation factors. For such embodiments, if two or more untagged clusters have the same suggested tagging data (e.g., "Alice") and their respective correlation factors with respect to the suggested tag exceed an automatic merge threshold level, then the two untagged clusters 704, 724, 734 are merged into a larger untagged cluster having the suggested tag. Generally, the automatic merge threshold level will be greater than the confidence level used for selectively displaying untagged clusters 704, 724, 734 but may also be equal to this value. Note that depending on the implementation, the process of automatically merging untagged clusters may be performed before or after the step of selectively displaying untagged clusters.

Figure 8:
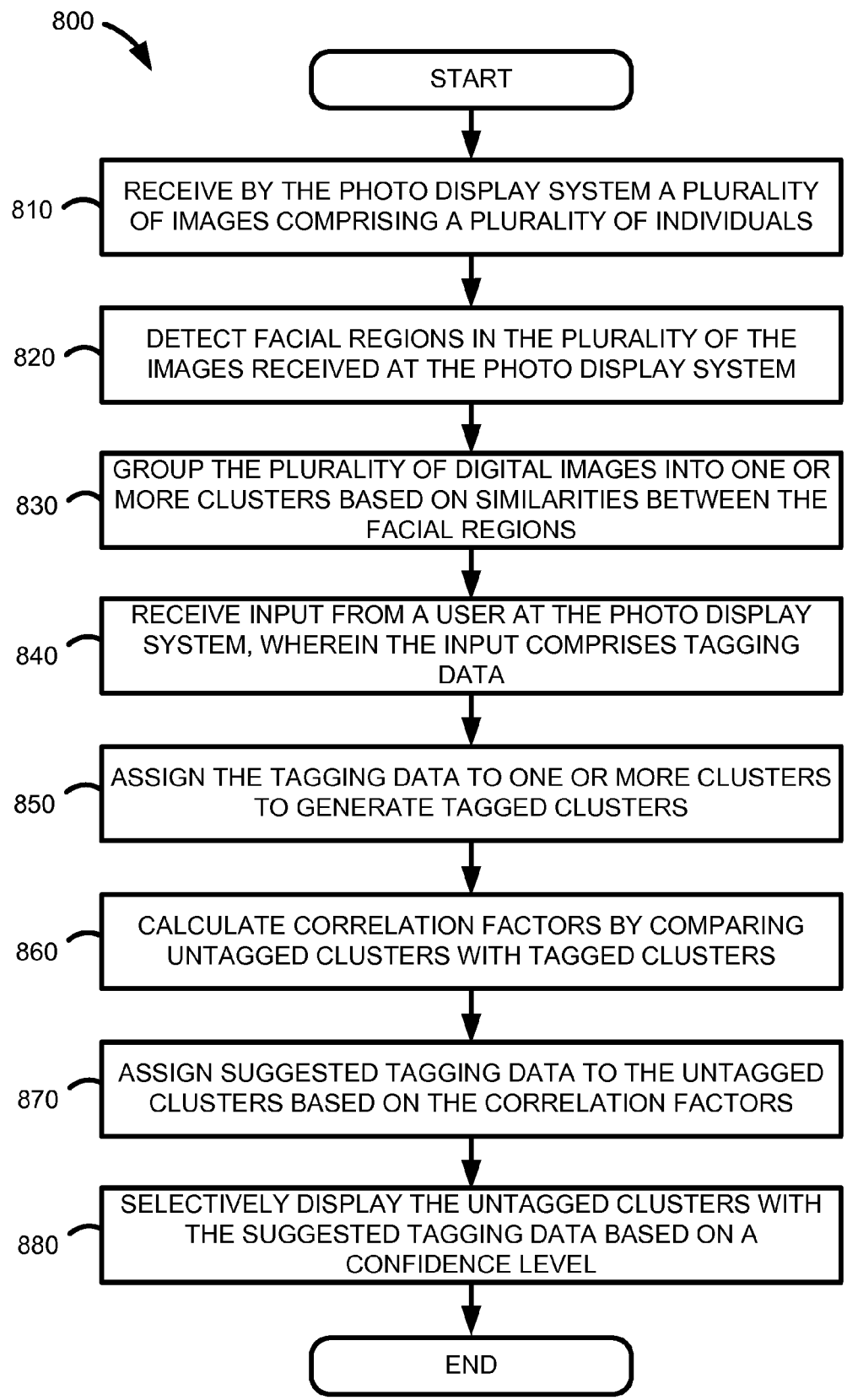
FIG. 8 is a flowchart of an embodiment for tagging photos implemented in the photo layout system of FIG. 1.

FIG. 8 is a flowchart 800 of an embodiment for tagging photos implemented in the photo layout system 102 of FIG. 1. It should be noted that if embodied in software, each block may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

Block 810 begins by receiving a plurality of digital images 115 at the photo display system 102. In block 820, the facial regions of the digital images are detected, and in block 830, the digital images 115 are grouped into one or more clusters based on similarities between the facial regions within the digital images 115. In block 840, tagging data associated with the one or more cluster is received from a user at the photo display system 102. In block 850, the tagging data received from the user is assigned to one or more clusters to generate tagged clusters. In block 860, correlation factors are calculated by comparing untagged clusters with tagged clusters. In block 870, suggested tagging data is assigned to the untagged clusters based on the correlation factors, and in block 880, the untagged clusters with the suggested tagging data are selectively displayed based on a confidence level.

Figure 9:
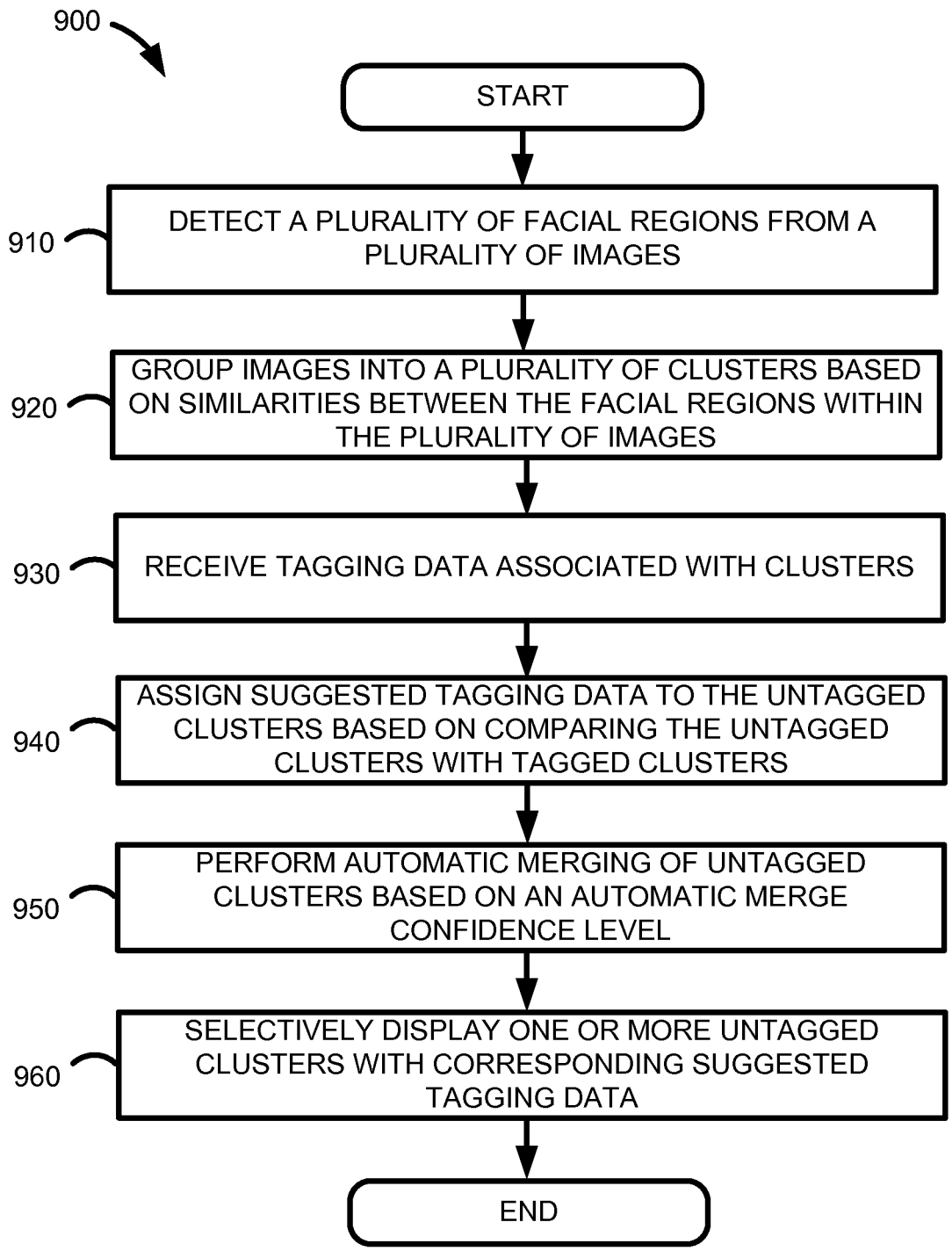
FIG. 9 is a flowchart of an alternative embodiment for tagging photos implemented in the photo layout system of FIG. 1.

FIG. 9 is a flowchart 900 of an alternative embodiment for tagging photos implemented in the photo layout system 102 of FIG. 1. As with FIG. 7, it should be noted that if embodied in software, each block may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

Beginning with block 910, a plurality of facial regions is detected from a plurality of images 115. As described earlier, the images may be received at the photo display system 102 of FIG. 1 through various means. In block 920, the facial regions are groups into a plurality of clusters based on similarities between the facial regions within the plurality of images. Such similarities may relate to, for example, the facial features (e.g., eyes, nose). In block 930, tagging data associated with clusters is received. For some implementations, this may be performed by displaying a user interface at the photo display system 102 for a user to manually enter some type of descriptor (such as names of individuals). In block 940, suggested tagging data is assigned to the untagged clusters based on comparing the untagged clusters with tagged clusters. In accordance with some embodiments, this may comprise generating correlation factors as described earlier and identifying the pair (comprising an untagged cluster and a tagged cluster) that yielded the highest correlation factor. The correlation factor may be further compared to a threshold value to determine whether the correlation is reliable. In block 950, untagged clusters are automatically merged together based on an automatic merge confidence level. In block 960, one or more untagged clusters with corresponding suggested tagging data is selectively displayed. For some embodiments, this may comprise selectively displaying untagged clusters based on a confidence level, which may be greater than or equal to the automatic merge confidence level used in block 950.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:
1. A method of tagging photos utilizing a computer-implemented photo display system, comprising:
    receiving by the photo display system a plurality of images comprising a plurality of individuals;
    detecting facial regions in the plurality of the images received at the photo display system;

grouping the plurality of digital images into one or more clusters based on similarities between the facial regions;

receiving input from a user at the photo display system, wherein the input comprises a tagging data;

assigning the tagging data to the one or more clusters to generate tagged clusters;

calculating correlation factors by comparing untagged clusters with tagged clusters;

assigning suggested tagging data to the untagged clusters based on the correlation factors;

determining a number of the untagged clusters to be displayed based on a confidence level, wherein the confidence level comprises the correlation factors corresponding to untagged clusters exceeding a confidence level; and displaying the number of the untagged clusters with the highest correlation factors, wherein the untagged clusters are displayed with the suggested tagging data.

2. The method of claim 1, wherein displaying the untagged clusters with the suggested tagging data comprises displaying the untagged clusters with the suggested tagging data based on a confidence level.

3. The method of claim 2, wherein displaying the untagged clusters based on a confidence level comprises displaying the untagged clusters if correlation factors corresponding to the untagged clusters exceed the confidence level.

4. The method of claim 1, wherein displaying the untagged clusters with the suggested tagging data comprises displaying the untagged clusters with the suggested tagging data based on prioritizing the correlation factors from a highest correlation factor to a lowest correlation factor.

5. The method of claim 1, wherein calculating correlation factors is performed based on similarities of attributes in the facial regions associated with the clusters.

6. The method of claim 1, wherein the tagging data comprises names of individuals associated with the facial regions.

7. The method of claim 1, wherein assigning suggested tagging data to the untagged clusters based on the correlation factors comprises identifying a comparison of an untagged cluster with a tagged cluster that results in a highest correlation factor with respect to remaining comparisons.

8. The method of claim 7, wherein assigning suggested tagging data to the untagged clusters based on the correlation factors further comprises:

comparing the highest correlation factor with a predetermined threshold; and based on the comparison, associating the untagged cluster with the tagged cluster.

9. The method of claim 8, wherein associating the untagged cluster with the tagged cluster comprises assigning suggested tagging data to the tagged cluster to the untagged cluster, wherein the suggested tagging data comprises a tag of the tagged cluster.

10. The method of claim 1, further comprising receiving one of:

a confirmation of one or more suggested tagging data, wherein the untagged clusters are converted to tagged clusters; and a modification of one or more of the suggested tagging data.

11. The method of claim 10, wherein the confirmation comprises a collective confirmation for all suggested tagging data, wherein the collective confirmation comprises receiving a single input from the user at the photo display system.

12. The method of claim 11, wherein the single input comprises a single click using a mouse device.

13. The method of claim 1, further comprising automatically merging untagged clusters based on an automatic merge confidence level.

14. The method of claim 13, wherein automatically merging untagged clusters is performed prior to displaying the untagged clusters with the suggested tagging data.

15. A method for tagging photos in a computer-implemented photo display system, comprising:

detecting facial regions in a plurality of images;

forming clusters of images based on similarities between the facial regions;

receiving tagging data associated with the clusters; and assigning suggested tagging data to the untagged clusters based on comparing the untagged clusters with tagged clusters;

determining a number of the untagged clusters to be displayed based on a confidence level, wherein the confidence level comprises the correlation factors corresponding to untagged clusters exceeding a confidence level; and displaying the number of the untagged clusters with the highest correlation factors, wherein the untagged clusters are displayed with the suggested tagging data.

16. The method of claim 15, wherein displaying one or more untagged clusters with corresponding suggested tagging data is performed based on a confidence level.

17. The method of claim 15, wherein receiving tagging data comprises receiving names of one or more individuals associated with the clusters.

18. The method of claim 15, wherein tagging the untagged clusters based on comparing the untagged clusters with tagged clusters comprises:

deriving correlation factors between untagged clusters and each of the tagged clusters; and associating untagged clusters with tagged clusters based on the correlation factors.

19. The method of claim 18, wherein associating untagged clusters with tagged clusters based on the correlation factors comprises identifying an untagged cluster compared with a tagged cluster that results in a highest correlation factor with respect to the other tagged clusters and that exceeds a threshold.

20. The method of claim 19, wherein the threshold is based on attributes associated with the plurality of images.

21. The method of claim 19, further comprising receiving either a confirmation or a modified tag in response to associating an untagged cluster with a tagged cluster.

22. The method of claim 21, wherein receiving either a confirmation or a modified tag comprises receiving input from a user via a user interface.

23. A system tagging photos utilizing a computer-implemented photo display system, comprising:

logic for receiving by the photo display system a plurality of images comprising a plurality of individuals;

logic for detecting facial regions in the plurality of the images received at the photo display system;

logic for grouping the plurality of digital images into one or more clusters based on similarities between the facial regions;

logic for receiving input from a user at the photo display system, wherein the input comprises a tagging data;

logic for assigning the tagging data to the one or more clusters to generate tagged clusters;

logic for calculating correlation factors by comparing untagged clusters with tagged clusters;

logic for assigning suggested tagging data to the untagged clusters based on the correlation factors;

logic for determining a number of the untagged clusters to be displayed based on a confidence level, wherein the confidence level comprises the correlation factors corresponding to untagged clusters exceeding a confidence level; and logic for displaying the number of the untagged clusters with the highest correlation factors, wherein the untagged clusters are displayed with the suggested tagging data.

24. The system of claim 23, wherein the logic for displaying the untagged clusters with the suggested tagging data comprises logic for displaying the untagged clusters with the suggested tagging data based on a confidence level.

25. The system of claim 24, wherein the logic for displaying the untagged clusters based on a confidence level comprises logic for displaying the untagged clusters if correlation factors corresponding to the untagged clusters exceed the confidence level.

26. The system of claim 23, wherein the logic for displaying the untagged clusters with the suggested tagging data comprises logic for displaying the untagged clusters with the suggested tagging data based on prioritizing the correlation factors from a highest correlation factor to a lowest correlation factor.

27. The system of claim 23, wherein the logic for calculating correlation factors operates based on similarities of attributes in the facial regions associated with the clusters.

28. The system of claim 23, wherein the tagging data comprises names of individuals associated with the facial regions.

29. The system of claim 23, wherein the logic for assigning suggested tagging data to the untagged clusters based on the correlation factors comprises logic for identifying a comparison of an untagged cluster with a tagged cluster that results in a highest correlation factor with respect to remaining comparisons.

30. The system of claim 29, wherein the logic for assigning suggested tagging data to the untagged clusters based on the correlation factors further comprises:

logic for comparing the highest correlation factor with a predetermined threshold; and logic for based on the comparison, associating the untagged cluster with the tagged cluster.

31. The system of claim 30, wherein the logic for associating the untagged cluster with the tagged cluster comprises logic for assigning suggested tagging data to the tagged cluster to the untagged cluster, wherein the suggested tagging data comprises a tag of the tagged cluster.

32. The system of claim 23, further comprising logic for receiving one of:

a confirmation of one or more suggested tagging data, wherein the untagged clusters are converted to tagged clusters; and a modification of one or more of the suggested tagging data.

33. The system of claim 32, wherein the confirmation comprises a collective confirmation for all suggested tagging data, wherein the collective confirmation comprises receiving a single input from the user at the photo display system.

34. The system of claim 33, wherein the single input comprises a single click using a mouse device.

35. The system of claim 23, further comprising logic for automatically merging untagged clusters based on an automatic merge confidence level.

36. The system of claim 35, wherein the automatically merging untagged clusters is performed prior to displaying the untagged clusters with the suggested tagging data.

37. The method of claim 1, wherein the suggested tagging data assigned to each untagged cluster consists of a single name of an individual.

* * * * *